(12) United States Patent
Shiose

(10) Patent No.: US 9,355,326 B2
(45) Date of Patent: May 31, 2016

(54) IMAGE PROCESSING APPARATUS, RULED LINE DETERMINATION METHOD, AND STORAGE MEDIUM HAVING RULED LINE DETERMINATION PROGRAM STORED THEREIN

(71) Applicant: KYOCERA Document Solutions Inc., Osaka-shi, Osaka (JP)

(72) Inventor: Masato Shiose, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 132 days.

(21) Appl. No.: 14/261,308

(22) Filed: Apr. 24, 2014

(65) Prior Publication Data

US 2014/0321716 A1    Oct. 30, 2014

(30) Foreign Application Priority Data

Apr. 25, 2013  (JP) .................................. 2013-092261

(51) Int. Cl.
*G06K 9/00*    (2006.01)
*G06K 9/34*    (2006.01)

(52) U.S. Cl.
CPC ............ *G06K 9/346* (2013.01); *G06K 2209/01* (2013.01); *H04N 2201/0081* (2013.01)

(58) Field of Classification Search
CPC .......... G06K 2209/01; G06K 9/00449; G06K 9/346; H04N 2201/0081
See application file for complete search history.

(56) References Cited

U.S. PATENT DOCUMENTS

| | | | | |
|---|---|---|---|---|
| 5,581,635 | A * | 12/1996 | Zhu ......................... | G06T 3/606 382/235 |
| 5,859,929 | A * | 1/1999 | Zhou ...................... | G06K 9/346 382/175 |
| 6,434,270 | B1 * | 8/2002 | Ohara .................... | G06K 9/346 382/178 |
| 8,189,921 | B2 * | 5/2012 | Eguchi ............... | G06K 9/00449 382/162 |
| 8,582,888 | B2 * | 11/2013 | Tanaka ............... | G06K 9/00449 382/151 |
| 2002/0181777 | A1 | 12/2002 | Sumikawa et al. | |
| 2005/0201620 | A1 | 9/2005 | Kanamoto et al. | |
| 2005/0226510 | A1 * | 10/2005 | Eguchi ..................... | G06K 9/32 382/199 |
| 2008/0040655 | A1 * | 2/2008 | Tanaka ............... | G06K 9/00449 715/228 |
| 2009/0220154 | A1 * | 9/2009 | Daidoh .................. | G06K 9/346 382/182 |

FOREIGN PATENT DOCUMENTS

| | | |
|---|---|---|
| JP | 2000222524 A | 8/2000 |
| JP | 2002366895 A | 12/2002 |
| JP | 2005258683 A | 9/2005 |
| JP | 2007081882 A | 3/2007 |
| JP | 2007193446 A | 8/2007 |
| JP | 2008141384 A | 6/2008 |

* cited by examiner

*Primary Examiner* — Tom Y Lu
(74) *Attorney, Agent, or Firm* — Alleman Hall McCoy Russell & Tuttle LLP

(57) ABSTRACT

An image processing apparatus according to one aspect of the present disclosure includes a first image extraction portion and a first determination portion. The first image extraction portion is configured to extract, from image data, a plurality of linear images in each of which reference pixels each having a tone in a predetermined range are continuous so as to form a straight line. The first determination portion is configured to determine, when the plurality of linear images extracted by the first image extraction portion include linear images that are spaced by a uniform distance, the linear images that are spaced by the uniform distance, as ruled lines.

10 Claims, 9 Drawing Sheets

IMAGE PROCESSING APPARATUS, RULED LINE DETERMINATION METHOD, AND STORAGE MEDIUM HAVING RULED LINE DETERMINATION PROGRAM STORED THEREIN

INCORPORATION BY REFERENCE

This application is based upon and claims the benefit of priority from the corresponding Japanese Patent Application No. 2013-092261 filed on Apr. 25, 2013, the entire contents of which are incorporated herein by reference.

BACKGROUND

The present disclosure relates to an image processing apparatus, a ruled line determination method, and a storage medium having a ruled line determination program stored therein, configured to determine ruled lines in image data.

When a document, such as a notebook with ruled lines, on which characters and the like are handwritten by a pencil, a ball-point pen, or the like is coped, the document may be copied with a set density being enhanced in order to clarify faint characters in some cases. In this case, a print density for the ruled lines preprinted on the notebook as well as a print density for the copied handwritten characters is enhanced. Therefore, the ruled lines copied with the enhanced print density become a hindrance and the copied handwritten characters become unclear and are difficult to distinguish.

To date, a technique for eliminating ruled lines when a document is copied, in order to address such a problem, has been known. Specifically, a ruled line elimination method has been known in which, in image data in which characters and ruled lines are formed by the same color, a portion, of the image data, in which black pixels are continuous over a predetermined length or longer in the main scanning direction and the sub-scanning direction is estimated as a ruled line, and whether the estimated ruled line represents a ruled line or a character is determined according to an intersecting pattern between the estimated ruled line portion and a black image, thereby eliminating the ruled lines. Further, an image processing apparatus has been known which determines, after an image is changed into a monochrome image, that continuous pixels which are continuous over a predetermined threshold length or greater length represent one ruled line, and determines that continuous pixels which connect with the one ruled line with a specific intersecting pattern also represent another ruled line, to eliminate the one ruled line and the other ruled line.

SUMMARY

An image processing apparatus according to one aspect of the present disclosure includes a first image extraction portion and a first determination portion. The first image extraction portion is configured to extract, from image data, a plurality of linear images in each of which reference pixels each having a tone in a predetermined range are continuous so as to form a straight line. The first determination portion is configured to determine, when the plurality of linear images extracted by the first image extraction portion include linear images that appear so as to be spaced by a uniform distance, the linear images that are spaced by the uniform distance, as ruled lines.

A ruled line determination method according to another aspect of the present disclosure includes a first image extraction step and a first determination step. The first image extraction step extracts, from image data, a plurality of linear images in each of which reference pixels each having a tone in a predetermined range are continuous so as to form a straight line. The first determination step determines, when the plurality of linear images extracted by the first image extraction step include linear images that are spaced by a uniform distance, the linear images that are spaced by the uniform distance, as ruled lines.

A non-transitory storage medium according to still another aspect of the present disclosure has a ruled line determination program stored therein. The ruled line determination program causes a computer to execute a first image extraction step and a first determination step. The first image extraction step extracts, from image data, a plurality of linear images in each of which reference pixels each having a tone in a predetermined range are continuous so as to form a straight line. The first determination step determines, when the plurality of linear images extracted by the first image extraction step include linear images that are spaced by a uniform distance, the linear images that are spaced by the uniform distance, as ruled lines.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, with reference to the accompanying drawings, an embodiment of the present disclosure will be described for the understanding of the present disclosure. The embodiment described below represents an exemplary implementation of the present disclosure, and the technical scope of the present disclosure is not limited by the embodiment described below.

<Schematic Structure of Multifunction Peripheral 100>

Figure 1A:
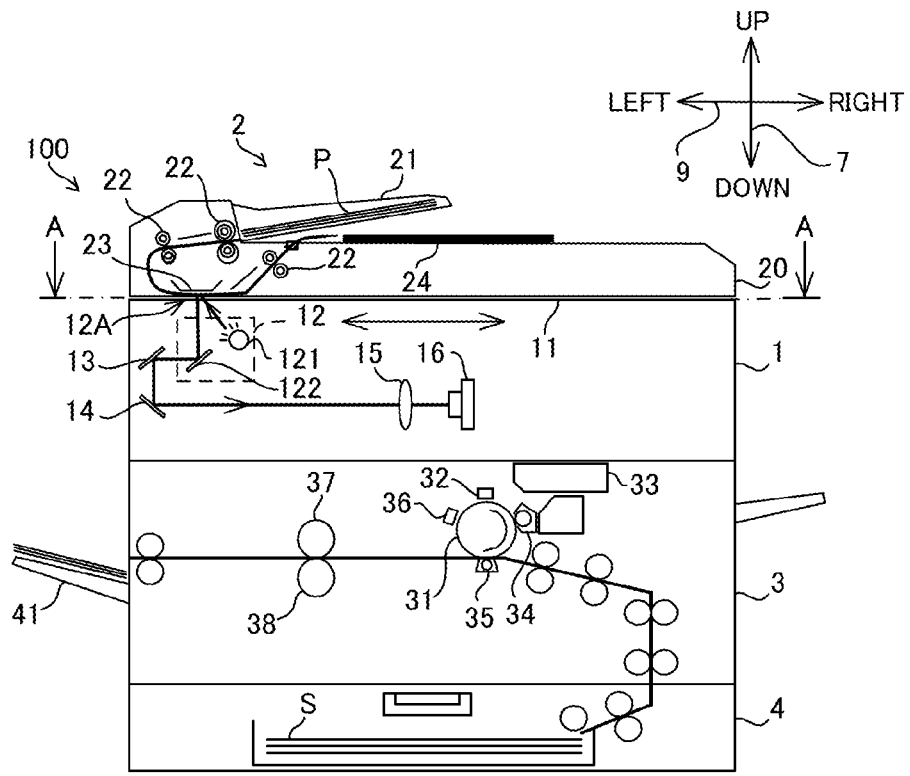
FIG. 1A and FIG. 1B are each a cross-sectional view schematically illustrating an outline of a structure of a multifunction peripheral according to an embodiment of the present disclosure.
Figure 1B:
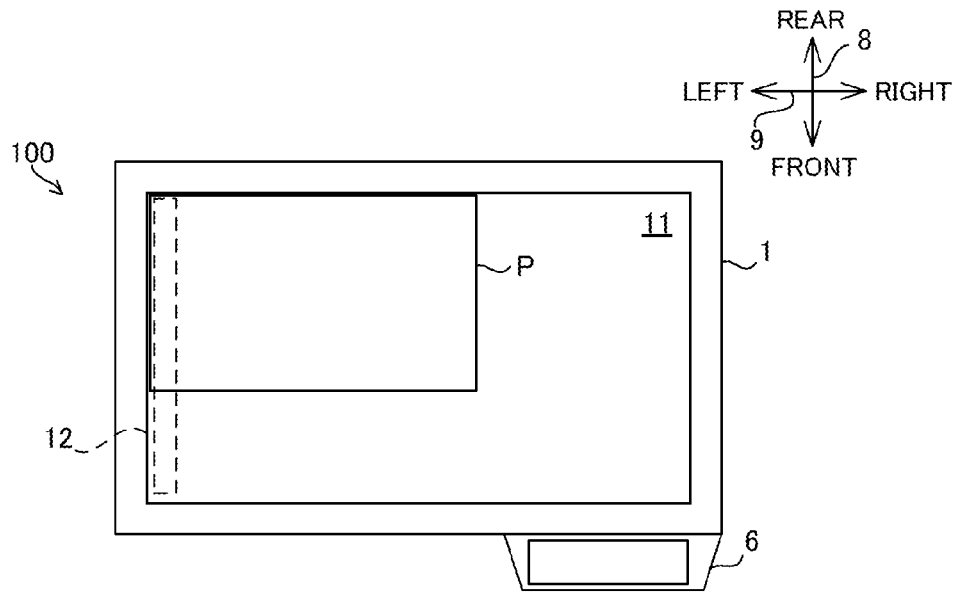

Firstly, a schematic structure of a multifunction peripheral 100 according to an embodiment of the present disclosure will be described with reference to FIG. 1A and FIG. 1B. FIG. 1A schematically illustrates an internal structure of the multifunction peripheral 100. FIG. 1B is a plan view as seen from the direction of arrows IB-IB in FIG. 1A.

The multifunction peripheral 100 is an image processing apparatus that includes an image reading portion 1, an ADF (automatic document feeder) 2, an image forming portion 3, a sheet feed portion 4, an operation display portion 6, and the like. The operation display portion 6 is implemented as, for example, a touch panel that displays various information according to control instructions from a control portion 5 (see FIG. 2), and inputs various information to the control portion 5 according to an operation performed by a user. The multifunction peripheral 100 is merely an example of the image processing apparatus of the present disclosure. For example, in the present disclosure, the image processing apparatus may be a scanner, a printer, a facsimile apparatus, a copy machine, a personal computer, or the like.

The image reading portion 1 obtains color image data from a paper sheet P. The image reading portion 1 includes a paper sheet cover 20, a contact glass 11, a reading unit 12, a mirror 13, a mirror 14, an optical lens 15, a CCD (Charge Coupled Device) 16, and the like. The contact glass 11 is a transparent paper sheet table which is provided on the top surface of the image reading portion 1, and on which the paper sheet P having an image to be read by the multifunction peripheral 100 is placed.

The paper sheet cover 20 covers the contact glass 11 as appropriate. The image reading portion 1 is controlled by the control portion 5 to read image data from the paper sheet P placed on the contact glass 11.

The reading unit 12 includes a LED light source 121 and a mirror 122. The reading unit 12 can be moved in the sub-scanning direction (right-left direction 9 in FIG. 1A) by a not-illustrated moving mechanism using a moving unit such as a stepping motor. When the reading unit 12 is moved, by the moving mechanism, in the sub-scanning direction, light applied from the LED light source 121 to the contact glass 11 is scanned in the sub-scanning direction.

The LED light source 121 includes multiple white LEDs aligned along the main scanning direction (front-rear direction 8 in FIG. 1B) of the multifunction peripheral 100. The LED light source 121 applies one line of white light to the paper sheet P at a reading position 12A on the contact glass 11. The reading position 12A shifts in the sub-scanning direction according to the movement of the reading unit 12 in the sub-scanning direction.

The mirror 122 reflects, toward the mirror 13, reflected light obtained by light being applied from the LED light source 121 to the paper sheet P at the reading position 12A. The light reflected by the mirror 122 is guided to the optical lens 15 by the mirror 13 and the mirror 14. The optical lens 15 focuses the incident light on the CCD 16.

The CCD 16 is a photoelectric converter that converts the received light to an electrical signal (voltage) according to an amount of the received light, to output the electrical signal to the control portion 5. Specifically, the CCD 16 generates image data based on the electrical signal corresponding to an image on the paper sheet P according to the light reflected by the paper sheet P when light is applied from the LED light source 121.

The ADF 2 is provided in the paper sheet cover 20. The ADF 2 is an automatic document feeding device that includes a paper sheet tray 21, a plurality of conveying rollers 22, a sheet presser 23, a sheet discharge portion 24, and the like.

The ADF 2 conveys the paper sheet P set on the paper sheet tray 21, to the sheet discharge portion 24, through the reading position 12A on the contact glass 11, by each of the conveying rollers 22 being driven by a not-illustrated stepping motor. At this time, the image reading portion 1 reads image data from the paper sheet P that passes through the reading position 12A.

The sheet presser 23 is disposed above the reading position 12A on the contact glass 11 so as to be distant from the reading position 12A by a space through which the paper sheet P can pass. The sheet presser 23 is elongated in the main scanning direction, and a white sheet is adhered to the lower surface (the surface on the contact glass 11 side) of the sheet presser 23. In the multifunction peripheral 100, image data of the white sheet is read as white reference data. The white reference data is used for a well-known shading correction, and the like.

The image forming portion 3 executes an image forming process (printing process) by electrophotography, based on the image data read by the image reading portion 1, or image data inputted from an information processing device such as an external personal computer.

The image forming portion 3 includes a photosensitive drum 31, a charging device 32, an LSU (Laser Scanning Unit) 33, a developing device 34, a transfer roller 35, an electricity removing device 36, a fixing roller 37, a pressure roller 38, and the like. In the image forming portion 3, an image is formed on a paper sheet S conveyed by the sheet feed portion 4 in the following procedure and the paper sheet S having the image formed thereon is discharged onto a sheet discharge tray 41.

To be specific, firstly, the photosensitive drum 31 is uniformly charged at a predetermined potential by the charging device 32. Next, light based on the image data is applied to the surface of the photosensitive drum 31 by the LSU 33. Thus, an electrostatic latent image is formed on the surface of the photosensitive drum 31. The electrostatic latent image on the photosensitive drum 31 is developed (visualized) into a toner image by the developing device 34. Subsequently, the toner image formed on the photosensitive drum 31 is transferred to the paper sheet S by the transfer roller 35. Thereafter, when the paper sheet S passes between the fixing roller 37 and the pressure roller 38 and is discharged, the toner image having been transferred to the paper sheet S is heated by the fixing roller 37 to be fused and fixed onto the paper sheet S. The potential on the photosensitive drum 31 is removed by the electricity removing device 36.

Figure 2:
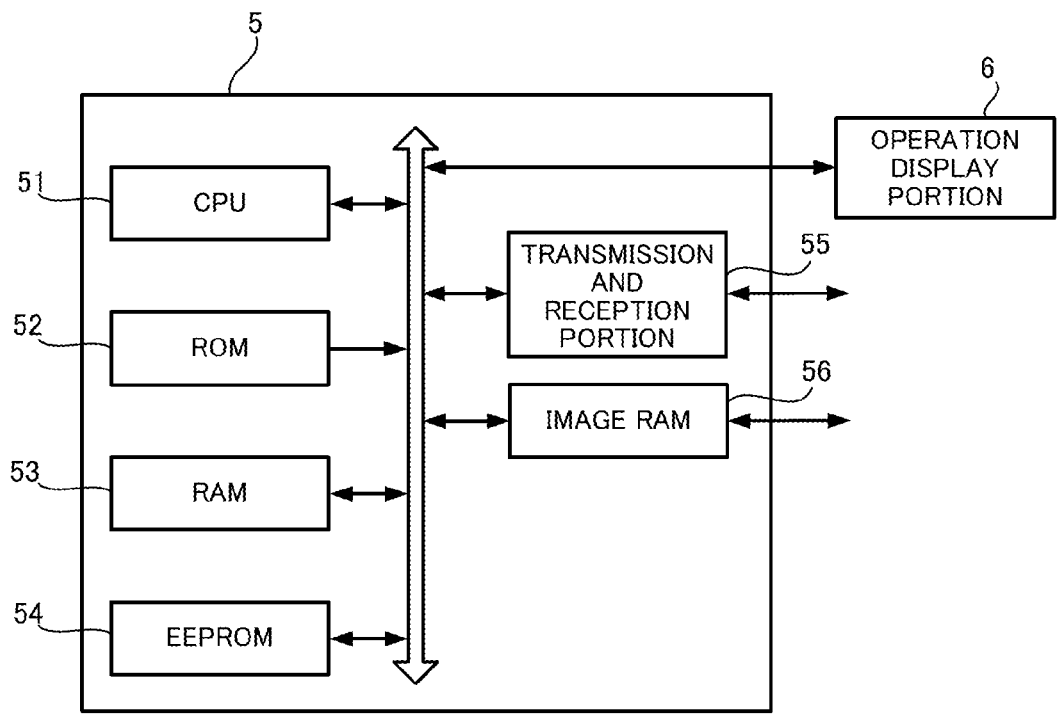
FIG. 2 is a block diagram illustrating an outline of a structure of a control portion.

Next, a function of the control portion 5 will be schematically described with reference to FIG. 2.

The control portion 5 includes a CPU 51, a ROM 52 (storage medium), a RAM 53, an EEPROM 54, a transmission and reception portion 55, an image RAM 56, and the like. The control portion 5 comprehensively controls the multifunction peripheral 100 by the CPU 51 executing a predetermined control program stored in the ROM 52. Further, in the ROM 52, a ruled line determination program by which a ruled line elimination process (see FIG. 3) described below is executed, is previously stored. The ruled line determination program is a program which causes CPU 51 of the control portion 5 to execute process steps in the flow chart shown in FIG. 3 and the like. The CPU 51 operates according to the ruled line determination program to eliminate a ruled line from image data. Further, the RAM 53 is a volatile storage medium, and the EEPROM 54 is a non-volatile storage medium. The RAM 53 and the EEPROM 54 are used as temporary storage memories for various processes executed by the CPU 51. The transmission and reception portion 55 obtains color image data from another image processing device under the control of the CPU 51. The image RAM 56 stores the color image data obtained by the image reading portion 1 and the transmission and reception portion 55.

The control portion 5 may be configured as an electronic circuit such as an integrated circuit (ASIC, DSP). The control portion 5 may be a control portion that is provided separately from a main control portion that comprehensively controls the multifunction peripheral 100.

<Ruled Line Elimination Process>

Figure 4A:
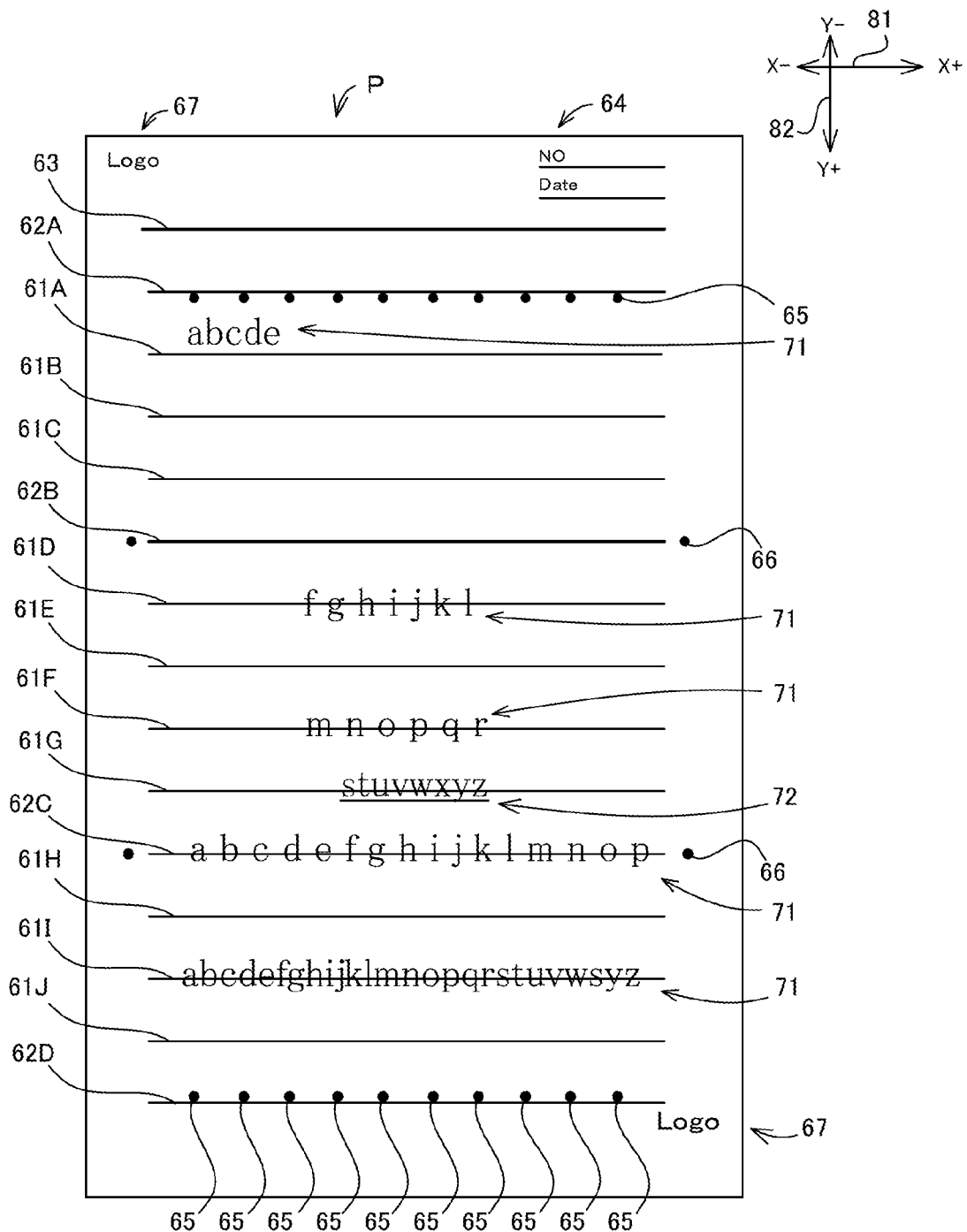
FIG. 4A and FIG. 4B illustrate an exemplary paper sheet from which ruled lines are yet to be eliminated.
Figure 4B:
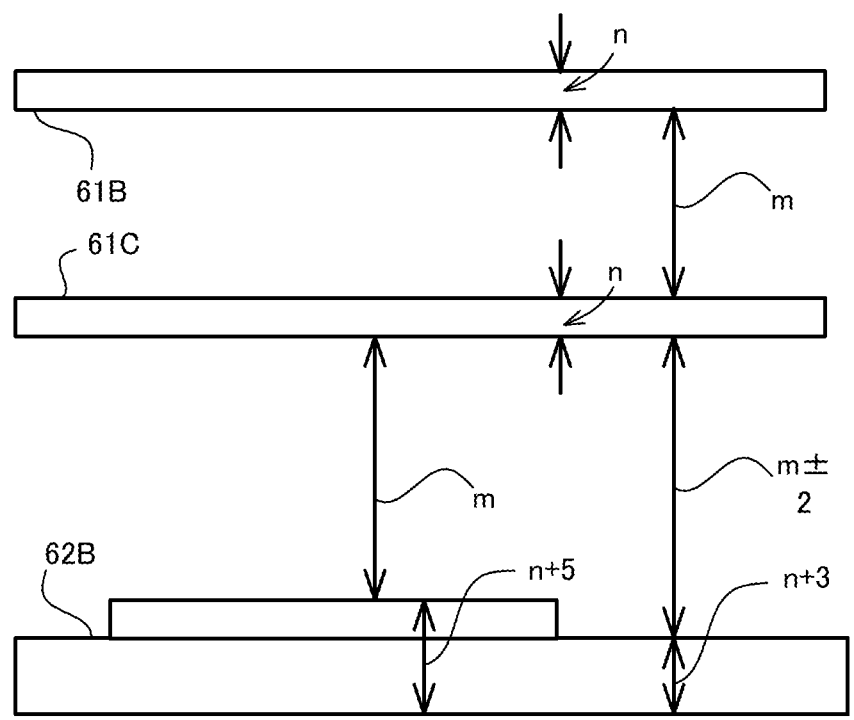
Figure 5:
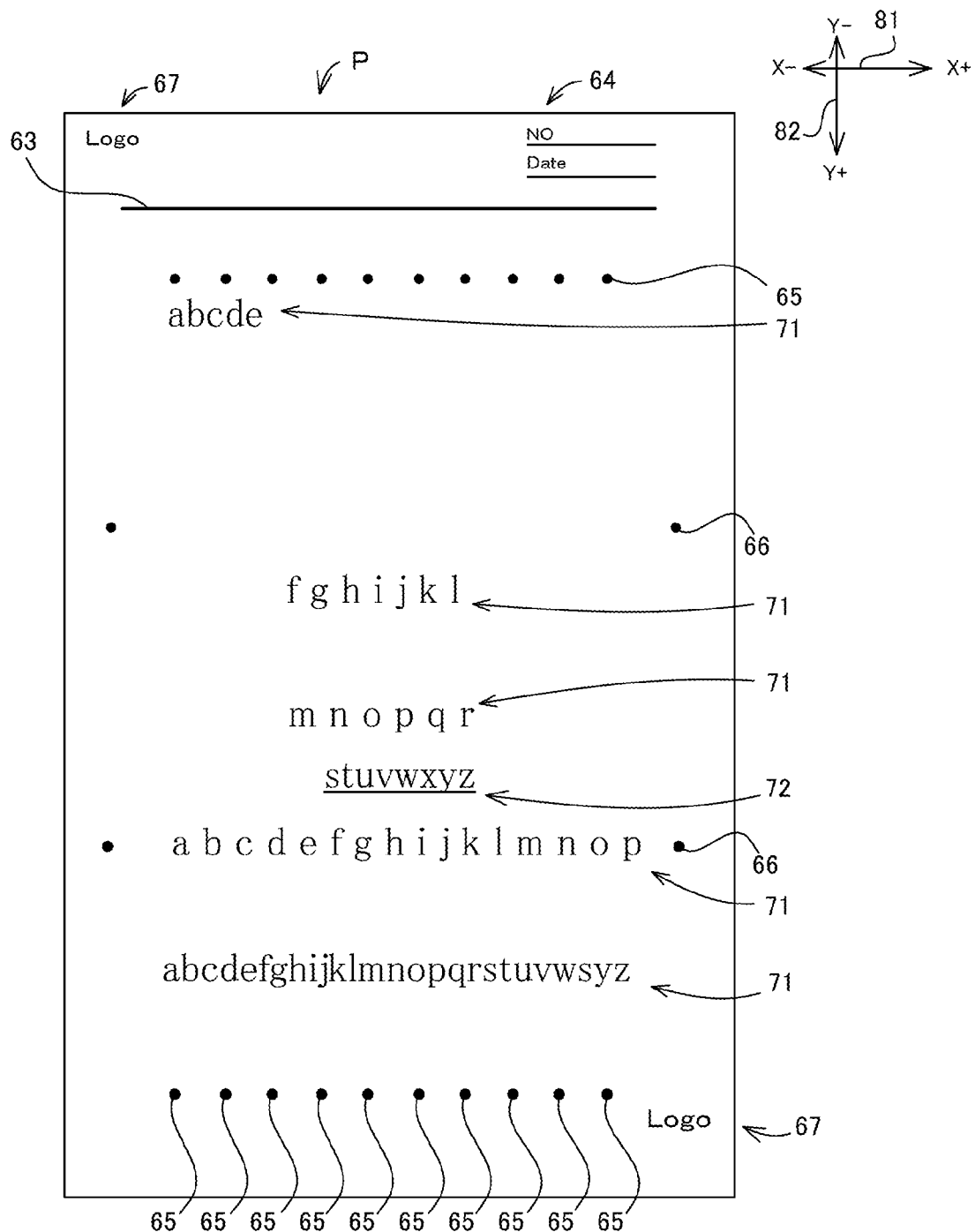
FIG. 5 illustrates an exemplary paper sheet from which the ruled lines have been eliminated.
Figure 6A:
FIG. 6A and FIG. 6B are enlarged views of an exemplary paper sheet from which ruled lines are yet to be eliminated.
Figure 6A:
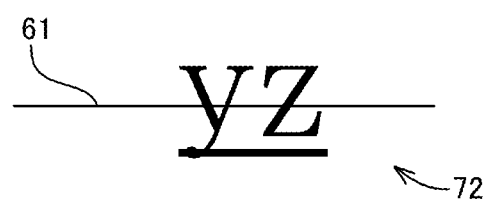
Figure 6B:
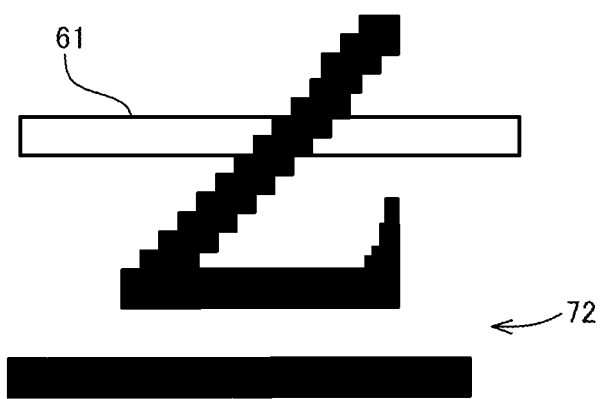

Hereinafter, a procedure of the ruled line elimination process executed by the control portion 5 and a ruled line determination method according to the present disclosure will be described with reference to a flow chart of FIG. 3, and the drawings of the paper sheet P shown in FIG. 4A to FIG. 6B. In the flow chart of FIG. 3, step S S1, S2, . . . represent procedure (step) numbers. When the control portion 5 executes the ruled line elimination process, the control portion 5 is examples of a first image extraction portion, a second image extraction portion, a third image extraction portion, a first determination portion, a second determination portion, a third determination portion, and an elimination portion according to the present disclosure. FIG. 4A and FIG. 4B illustrate an example of a paper sheet P from which ruled lines are yet to be eliminated. FIG. 5 illustrates an example of the paper sheet P from which the ruled lines have been eliminated. FIG. 6A and FIG. 6B are enlarged views of an example of the paper sheet P from which the ruled lines are yet to be eliminated.

The ruled line elimination process is executed according to a user inputting a coping instruction and a ruled line elimination instruction to the multifunction peripheral 100. In a case where the multifunction peripheral 100 is caused to read the paper sheet P for obtaining image data, the user places the paper sheet P on the contact glass 11 and then covers the paper sheet P with the paper sheet cover 20. When image data is obtained from an external storage medium, the user connects the external storage medium to a connection terminal of the multifunction peripheral 100. When image data is obtained from an external image processing device, the user connects the external image processing device to the connection terminal of the multifunction peripheral 100. Thus, step S1 described below, that is, an image reading process for reading the paper sheet P by the image reading portion 1 can be deleted from a series of process steps of the ruled line elimination process.

When an image forming instruction and a ruled line elimination instruction are inputted from the operation display portion 6, the control portion 5 executes step S1 and the following process steps.

For convenience of description, a resolution of the image reading portion 1 is 600 dpi (dots per inch), and the size of the paper sheet P is A4 (297 mm×210 mm). Image data read from the paper sheet P in these conditions includes pixels of 7016 pixels×4961 pixels. In the image data, 8 bits of gradation information is allocated to each of RGB colors in each pixel, and 16,777,216 colors can be displayed, that is, a so-called full color image can be displayed. Namely, the color depth of each pixel is 24 bpp (bits per pixel). Further, the sheet surface width direction of the paper sheet P and the paper sheet S is defined as an X-axis direction 81 (see FIG. 4A), and the sheet surface length direction of the paper sheet P and the paper sheet S is defined as a Y-axis direction 82 (see FIG. 4A).

(Step S1)

Initially, in step S 1, the control portion 5 causes the image reading portion 1 to obtain color image data including information of densities and hues of the paper sheet P, and stores the color image data in the image RAM 56. Further, according to need, the control portion 5 executes, for example, a background color removing process for removing a background color from the image data, a brightness conversion process for converting a brightness ratio in the image data, and a smoothing process for removing noise from the image data.

In the following description, in step S1, the control portion 5 obtains, at one time, the entirety of the color image data of one paper sheet P. However, the present disclosure is not limited thereto, and the control portion 5 may perform, in step S1, a process of obtaining the image data of the paper sheet P in units of plural lines. In this case, when the control portion 5 has obtained the plural lines of image data, the control portion 5 sets, as one block, the plural lines of image data having been obtained, and executes the ruled line elimination process for each block. Further, the control portion 5 may use information of ruled lines, which is used in the ruled line elimination process for a certain block, to execute the ruled line elimination process for a block that immediately follows the certain block.

(Step S2)

In step S2, the control portion 5 extracts, from the image data, a linear image in which reference pixels having tones in a predetermined range are continuous so as to form a straight line. Specifically, the control portion 5 extracts, from the image data, a linear image in which reference pixels having densities in a predetermined range and hues in a predetermined range are continuous so as to form a straight line. More specifically, the control portion 5 scans the image data in the width direction (the X-axis direction 81 of the paper sheet P), and extracts continuous pixels in which the reference pixels having densities and hues in the predetermined ranges are continuous in the width direction and the right-downward direction. Further, the control portion 5 similarly scans image data of a laterally inverted image, to extract continuous pixels in which the reference pixels having densities and hues in the predetermined ranges are continuous in the width direction and the right-upward direction. Thus, the linear image is extracted based on the reference pixels including densities and hues. Therefore, if the image data includes a portion where the linear image and another image intersect each other, the difference between the images can be determined with an enhanced accuracy, and only the linear image can be correctly extracted.

The predetermined range represents a range in which densities and hues are each determined as being at the same level. For example, when information of densities of low-order two bits of each of RGB colors is different between adjacent pixels, the densities of the adjacent pixels are determined as being in the predetermined range, whereby the control portion 5 determines the adjacent pixels as the continuous pixels. However, when information of densities of the third lowest bit and the higher-order bits is different between the adjacent pixels, the densities of the adjacent pixels are determined as being outside the predetermined range, whereby the control portion 5 determines that the adjacent pixels are not the continuous pixels.

When the control portion 5 extracts, from the image data, a plurality of the linear images in each of which the reference pixels having tones in the predetermined range are continuous so as to form a straight line in step S2 as described above, the control portion 5 is an example of the first image extraction portion of the present disclosure. Further, step S2 is an example of a first image extraction step of the ruled line determination method according to the present disclosure. In step S2, as described above, the linear image is extracted based on the reference pixels having densities and hues. However, the linear image may be extracted based on either the reference pixels having densities in the predetermined range or the reference pixels having hues in the predetermined range. Namely, the tone represents one or both of the density and the hue.

(Step S3)

In step S3, the control portion 5 extracts the linear image in which the number of the reference pixels that are continuous is greater than or equal to a first threshold value, from the linear images having been extracted in step S2. Specifically, the control portion 5 determines whether or not an absolute value of a value obtained by subtracting an X-coordinate value of the left end of the extracted linear image from an X-coordinate value of the right end of the extracted linear image is greater than or equal to the first threshold value, to determine whether or not the linear image is a candidate ruled line.

When the control portion 5 determines that there is no linear image in which the number of the reference pixels that are continuous is greater than or equal to the first threshold value, the control portion 5 ends the process (No in S3), that is, the control portion 5 determines that the image data includes no ruled lines.

On the other hand, when the control portion 5 determines that there is a linear image in which the number of the reference pixels that are continuous is greater than or equal to the first threshold value, the control portion 5 advances the process to step S4 (Yes in S3).

The first threshold value represents a length, in the width direction in the image data, by which the linear image is determined as a ruled line without a doubt. For example, for 4961 pixels corresponding to a width of an A4 size paper sheet P, the first threshold value may represent 2450 pixels that is about half of the 4961 pixels. In the paper sheet P shown in FIG. 4A, ruled lines 61A to 61C, 61E, 61H, and 61J, ruled thick lines 62A, 62B, and 62D, and a ruled line 63 for a title are extracted as candidate ruled lines.

When the control portion 5 extracts the linear images in each of which the number of pixels that are within the predetermined range and continuous so as to form a straight line is greater than or equal to the first threshold value, in step S3, as described above, the control portion 5 is another example of the first image extraction portion of the present disclosure. Thus, the control portion 5 is allowed to select, as the candidate ruled lines, only the linear images each having a sufficient length as a length of the ruled line.

(Step S4)

Next, in step S4, the control portion 5 determines whether or not the number of the plural linear images having been extracted in step S3 as the linear images in each of which the number of pixels that are continuous is greater than or equal to the first threshold value, is greater than or equal to three.

When the control portion 5 determines that the number of the linear images having been extracted from the image data is less than three, the control portion 5 ends the process (NO in S4). In this case, comparison in distance between the linear images cannot be performed in step S6 described below.

On the other hand, when the control portion 5 determines that the number of the linear images having been extracted from the image data is greater than or equal to three, the control portion 5 advances the process to step S5 (YES in S4).

(Step S5)

Next, in step S5, the control portion 5 calculates a distance between the plural linear images having been extracted in step S3. Specifically, the control portion 5 extracts X-coordinate values of a right end and a left end in the X-axis direction 81, and a Y-coordinate value in the Y-axis direction 82 for each of one extracted linear image and another linear image adjacent to the one extracted linear image. The control portion 5 subtracts the X-coordinate values of the right end and the left end and the Y-coordinate value of the other linear image from the X-coordinate values of the right end and the left end and the Y-coordinate value of the one extracted linear image, to obtain a distance at the right ends and a distance at the left ends. The control portion 5 determines that the linear images for which the distance at the right ends and the distance at the left ends are equal to each other are candidate ruled lines that are spaced from each other by a uniform distance.

(Step S6)

Next, in step S6, the control portion 5 determines whether or not the plural linear images include the linear images that are spaced by the uniform distance, based on the distance between the linear images that are determined in step S5 as the candidate ruled lines.

When the control portion 5 determines that the linear images that are spaced by the uniform distance do not exist, the control portion 5 ends the process (NO in S6). Namely, the control portion 5 determines that the image data includes no ruled lines.

On the other hand, when the control portion 5 determines that the linear images that are spaced by the uniform distance exist, the uniform distance is stored as a ruled line distance in the RAM 53, and the process is advanced to step S7 (YES in S6).

(Step S7)

Next, in step S7, the control portion 5 determines, as the ruled lines, the linear images that are spaced by the ruled line distance in the image data. Specifically, in consideration of an error in width of the ruled line and an error in ruled line distance, the control portion 5 determines the linear images as the ruled lines when the errors are within a predetermined distance range.

For example, in the paper sheet P shown in FIG. 4B, a distance between the ruled line 61B and the ruled line 61C each having the thickness of n pixels is m pixels, and a distance between the ruled line 61C and the ruled thick line 62B that has the thickness ranging from n+3 pixels to n+5 pixels and corresponds to one of the ruled thick lines which appear every 5 lines, ranges from m pixels to m+2 pixels. The control portion 5 determines that the distance of m pixels and the distances ranging from m pixels to m+2 pixels are within the predetermined distance range, to determine these distances as the ruled line distance. At this time, the control portion 5 determines, in further consideration of the ruled line 61B and the ruled line 61C each having the thickness of n pixels, and the ruled thick line 62B having the thickness ranging from n+3 pixels to n+5 pixels, whether or not the distances are each the ruled line distance.

Thus, the control portion 5 is allowed to determine, as the ruled lines, only the linear images each of which has a sufficient length as the length of the ruled line and which are spaced by the ruled line distance. For example, the control portion 5 determines, as the ruled lines, the ruled thick line 62A, the ruled lines 61A to 61C, the ruled thick line 62B, the ruled line 61J, and the ruled thick line 62D, in the paper sheet P shown in FIG. 4A. When the control portion 5 thus determines, in a case where the plural linear images extracted in step S3 include the linear images that are spaced by the ruled line distance, that the linear images spaced by the ruled line distance are the ruled lines, in step S4 through step S7, the control portion 5 is an example of the first determination portion of the present disclosure. Further, step S4 to step S7 represent an example of a first determination step of the ruled line determination method of the present disclosure.

(Step S8)

In step S8, the control portion 5 extracts, from the linear images extracted in step S2, the linear image which has not been determined as the ruled line and in which the number of the reference pixels that are continuous is greater than or equal to the first threshold value, and a sub-linear image in which the number of the reference pixels that are continuous is less than the first threshold value and greater than or equal to a second threshold value. Thus, the control portion 5 is allowed to also determine, as the candidate ruled line, the linear image that has not been determined as the candidate ruled line since the number of the reference pixels of the linear image is less than the first threshold value while the linear image is at a position where a ruled line is likely to exist. Further, when the sub-linear image is determined as the ruled line, some of the linear images which have not been determined as the ruled lines and in each of which the number of the reference pixels that are continuous is greater than or equal to the first threshold value, may be determined as the ruled lines. Therefore, the control portion 5 also determines these linear images as the candidate ruled lines.

While the second threshold value is less than the first threshold value, the second threshold value represents a sufficient length as obtained when the ruled line is likely to be separated by handwritten characters 71, handwritten characters 72, or the like.

In other words, the linear image extracted in step S3 represents an image in which the pixels within the predetermined range are continuous so as to form a straight line, and the number of the pixels that are continuous is greater than or equal to the first threshold value. When the control portion 5 extracts, from the image data, the sub-linear image in which pixels within the predetermined range are continuous, and the number of the pixels that are continuous is less than the first threshold value, and greater than or equal to the second threshold value, in step 8, the control portion 5 is an example of the second image extraction portion of the present disclosure.

(Step S9)

Next, in step S9, the control portion 5 determines whether or not one or both of the sub-linear image, and another linear image that has not been determined as the ruled line and in which the number of the pixels that are continuous is greater than or equal to the first threshold value, is located at a position spaced, by the ruled line distance, from the ruled line having been obtained in step S4 through step S7.

When the control portion 5 determines that neither the sub-linear image nor the other linear image is located at the position spaced, by the ruled line distance, from the obtained ruled line, the control portion 5 advances the process to step S11 (NO in S9). In this case, the control portion 5 determines that the image data includes no ruled lines except for the linear images having been determined as the ruled lines in step S7.

On the other hand, when the control portion 5 determines that one or both of the sub-linear image and the other linear image is located at the position spaced, by the ruled line distance, from the obtained ruled line, the control portion 5 advances the process to step S10 (YES in S9).

(Step S10)

Next, in step S10, the control portion 5 determines, as the ruled lines, the sub-linear image and the other linear image determined as being located at the position in step S9.

The second threshold value represents a length, in the width direction in the image data, which is likely to represent the ruled line. For example, the second threshold value may represent 240 pixels that are about one-twentieth of 4961 pixels corresponding to the width of an A4 size paper sheet P. In the paper sheet P shown in FIG. 4A, the control portion 5 determines ruled lines 61D, 61F, and 61G as the sub-linear images, and further determines the sub-linear images as the ruled lines. Further, the control portion 5 newly determines, as the ruled lines, a ruled line 61E and a ruled line 61H that are other linear images which have not been determined as the ruled lines in step S7 since each of the ruled line 61E and the ruled line 61H is not spaced by the ruled line distance, while each of the ruled line 61E and the ruled line 61H is the linear image in which the number of the pixels that are continuous is greater than or equal to the first threshold value.

Thus, when the control portion 5 determines, in the case of the sub-linear image being located at a position spaced, by the ruled line distance, from the ruled line obtained in step S7, that the sub-linear image is the ruled line, in step S10, the control portion 5 is an example of the second determination portion of the present disclosure. Further, when the control portion 5 determines, in step S10, that another linear image that is spaced, by the ruled line distance, from the sub-linear image determined as the ruled line in step S10 is the ruled line, the control portion 5 is another example of the first determination portion of the present disclosure.

The control portion 5 determines, as the ruled line, the linear image in which the number of the pixels that are continuous is greater than or equal to the first threshold value and which is likely to be the ruled line, in step S3 through step S7. On the other hand, in step S8 through step S10, based on a result of the determination that the linear image is likely to be the ruled line, the control portion 5 obtains the ruled line from the linear images having not been determined as the ruled lines in the above determination. In this process, when the paper sheet P is read in units of blocks each including plural lines in step S1, and the ruled line elimination process is executed for each block by the control portion 5, the linear image and the sub-linear image to be determined as the ruled lines can be prevented from being not determined as the ruled line.

(Step S11, Step S12)

Next, in step S11, the control portion 5 extracts, from the image data, pixels that are within the predetermined range and on the straight line as represented by the linear image or the sub-linear image having been determined as the ruled line, to determine the extracted pixels as the ruled line.

Thereafter, in step S12, the control portion 5 extracts, as dot-forming pixels, pixels that are within the predetermined range and located at positions spaced, by the ruled line distance, from the linear image or the sub-linear image having been determined as the ruled line, to determine the dot-forming pixels as the ruled line. The dot-forming pixels represent short lines into which the ruled line is divided by the handwritten characters 71 or the handwritten characters 72 appearing over a wide range on the ruled line, and the length of each short line into which the ruled line is divided, is shorter than the length represented by the second threshold value. Such dot-forming pixels are not extracted as the linear image in step S2, but are extracted by the execution of step S12 to be determined as a part of the ruled line.

Thus, the control portion 5 is allowed to determine, as the ruled line, parts, having short lengths, into which the ruled line 61F is divided by the handwritten characters 71. Therefore, the ruled line 61F can be distinguished, with enhanced accuracy, from the handwritten characters 71 that intersects the ruled line 61F. For example, in the paper sheet P shown in FIG. 4A, the control portion 5 newly determines, as the ruled lines, the ruled line pixels between characters in the ruled lines 61D, 61F, and 61G, and a ruled thick line 62C, by execution of step S11. Further, although a ruled line 61I cannot be determined as the ruled line in step S10 and the preceding process steps due to a lot of handwritten characters 71 being on the ruled line, the ruled line 61I is extracted as the dot-forming pixels and determined as the ruled line by execution of step S12. In step S11 and step S12, pixels in regions where inner portions inside the characters "O", "M", and the like of the handwritten characters 71 overlap the ruled line 61F, the ruled line 61I, and the like, are extracted as the dot-forming pixels, and determined as the ruled lines. Thus, the control portion 5 is allowed to determine small lines formed by division, as the ruled lines, with enhanced accuracy.

(Step S13)

In step S13, the control portion 5 eliminates, from the image data, all the pixels having been determined as the ruled lines.

For example, in the paper sheet P in which the ruled lines are yet to be eliminated as shown in FIG. 4A, the ruled line 61A to the ruled line 61J and the ruled thick line 62A to the ruled thick line 62D having been determined as the ruled lines are eliminated from the paper sheet P in the ruled line elimination process executed by the control portion 5, to obtain, for example, the paper sheet P in which the ruled lines have been eliminated as shown in FIG. 5. However, as shown in FIG. 5 and FIG. 6A, the ruled line 63, for a title, which is spaced by a distance different from the distance between the other ruled lines, and an underlined portion for the handwritten characters 72 are not eliminated. Thus, the control portion 5 is allowed to eliminate the preprinted ruled line portions, while preventing elimination of the underlined portion for the handwritten characters 72, and the ruled line 63, for a title, which is different from the other ruled lines, although the underlined portion and the ruled line 63 are likely to be eliminated in a conventional ruled line elimination according to binarization.

When the control portion 5 thus eliminates, from the image data, pixels which have been determined as the ruled lines and are to be eliminated, in step S13, the control portion 5 is an example of the elimination portion of the present disclosure.

(Step S14)

In step S14, the control portion 5 changes tones in regions of the pixels having been eliminated in step S13 to a tone of a background color image of the image data. Specifically, densities and hues in the regions of the eliminated pixels are changed to the density and hue of the background color image of the image data. When the background of the paper sheet P is white, step S14 need not be executed. However, in a case where the paper sheet P has a background color, when pixels of the ruled lines have been eliminated from the image data by the control portion 5 in step S13, the regions where the ruled lines have been positioned in an original document, have densities and hues different from those of the background color. Therefore, when the image data has a background color, the regions of the pixels eliminated by the control portion 5 are changed so as to have the density and hue of the background pixels, whereby easy viewing of the image data in which the ruled lines have been eliminated is enabled.

As a method for changing to the density and hue of the background color image, a method for changing the densities and hues so as to have preset values, or a method for extracting the density and hue of the background color image from the image data, can be used. For example, in the method for extracting the density and hue of the background color image, a plurality of adjacent pixels that are adjacent to the ruled lines are extracted, and the most common density and hue among the plurality of adjacent pixels may be used.

<Effect of Embodiment>

In conventional ruled line elimination techniques, when the ruled line intersects a character, a problem may arise that the ruled line is not correctly eliminated and remains, or a problem may arise that a part of the character is erroneously eliminated. However, as descried above, in the multifunction peripheral 100 of the present disclosure, the ruled lines can be extracted from image data with enhanced accuracy. As a result, erroneous elimination of a character is prevented, and only the ruled lines can be accurately eliminated.

Further, in a conventional ruled line elimination process, a complicated calculation process is required, for example, color information is eliminated from image data, and thereafter an intersecting pattern of a black image intersecting an estimated ruled line is detected, in order to extract the ruled lines. Specifically, since binarized image data is processed as it is, to determine ruled lines, a lot of complicated calculations are required for determining whether or not other pixels that intersect the ruled line represent the ruled line. However, in the multifunction peripheral 100 of the present disclosure, the ruled line is determined based on information of a distance between the ruled lines, and one or both of the densities and hues of pixels forming the ruled line, thereby reducing calculation processes.

<Modifications of Embodiment>

(First Modification)

In the above embodiment, an exemplary case is described in which the multifunction peripheral 100 obtains, from the image data of the paper sheet P, only the ruled lines that are spaced by the ruled line distance. However, the present disclosure is not limited thereto. Hereinafter, as a first modification of the embodiment, the multifunction peripheral 100 in which not only the ruled lines but also pixels having the same properties as the ruled lines are extracted from the paper sheet P and eliminated, will be described.

On paper sheets, such as typical notebooks, manuscript paper, and graph paper, on which the ruled lines are preprinted, information other than the ruled lines are preprinted at the same density and color as the ruled lines. Therefore, the multifunction peripheral 100 is allowed to extract, by using information of densities and hues of the pixels forming the ruled lines, print information other than the ruled lines.

Figure 3:
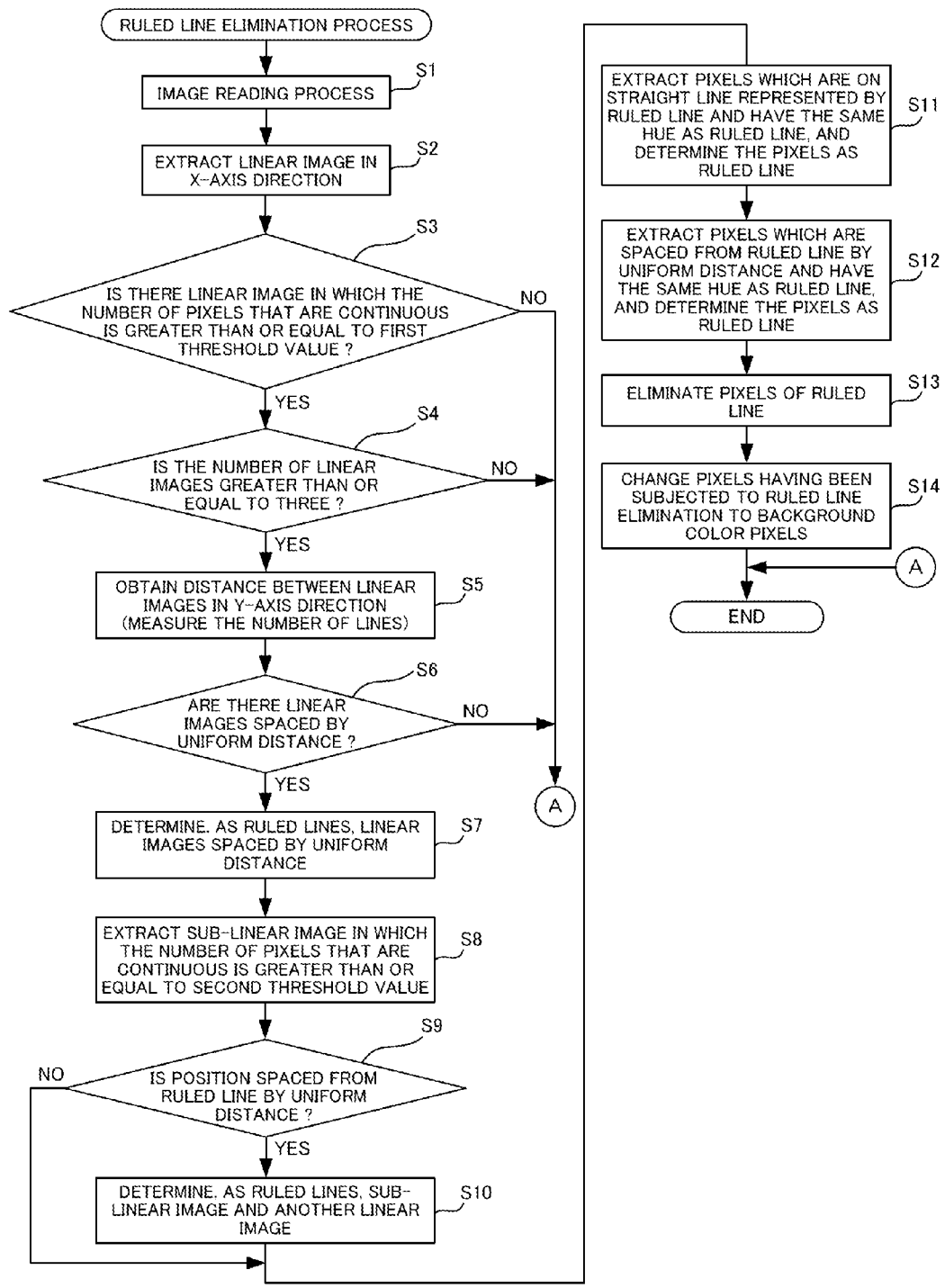
FIG. 3 is a flow chart showing an exemplary procedure of a ruled line elimination process.

The first modification is different from the above embodiment in process steps of step S8 and the following steps of the ruled line elimination process shown in FIG. 3. The other structure and process steps are the same between the first modification and the above embodiment. Therefore, the different contents will be described and the description of the common contents is not given.

Figure 7:
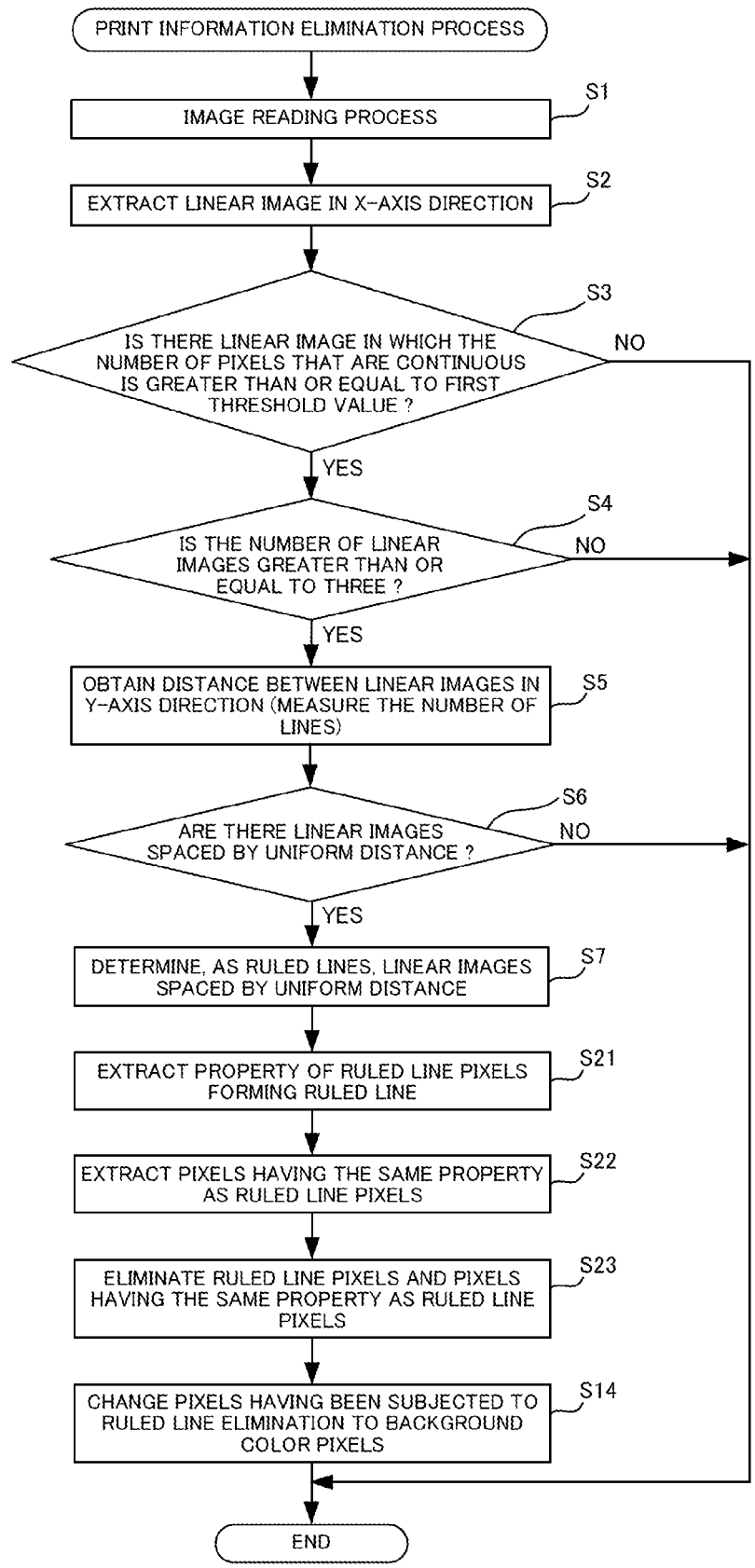
FIG. 7 is a flow chart illustrating an exemplary procedure of an image rotation process according to a first modification.

Hereinafter, a procedure of a print information elimination process executed by the control portion 5 will be described with reference to a flow chart of FIG. 7 and the drawings of the paper sheet P in FIG. 4A, FIG. 4B, and FIG. 5.

(Step S21, Step S22)

When the ruled line is obtained by the determination in step S7, the control portion 5 extracts, in step S21, information of a color and a density of ruled line pixels forming the ruled line.

Subsequently, in step S22, the control portion 5 extracts, from the image data, pixels having the same density and hue as the density and hue of the ruled line pixels extracted in step S21, as pixels (elimination pixels) to be eliminated.

Thus, the print information preprinted at the same density and hue as those of the ruled lines can be extracted from the paper sheet P. For example, in the paper sheet P shown in FIG. 4A, the ruled line 63 for a title, a page information entry column 64 on which date and number are written, column mark dots 65 representing columns, line mark dots 66 by which a position of a line is distinguishable every predetermined lines, and a logo mark 67 of the paper sheet P can be extracted by the control portion 5. When the control portion 5 thus extracts, from the image data, pixels having the same tone as a tone of the linear image determined as the ruled line in step S7, as pixels to be eliminated, in S21 and step S22, the control portion 5 is an example of a fourth image extraction portion.

(Step S23)

Subsequently, in step S23, the control portion 5 eliminates the pixels, to be eliminated, which have been extracted in step S22, from the image data, and advances the process to step S14. Thus, the control portion 5 is allowed to eliminate, from the image data of the paper sheet P, pixels having the same density and color as those of the ruled lines, and only the handwritten characters 71 and the handwritten characters 72 remain. Further, also in a case where lines that are orthogonal to the ruled lines and extend in the length direction, diagonal lines that are inclined relative to the ruled lines, dotted lines, or the like, which are not shown in the paper sheet P in FIG. 4A, are preprinted on the paper sheet P, when the color and density of pixels of the ruled lines are within the predetermined range, the control portion 5 can eliminate the above lines or the like.

In a case where the page information entry column 64 is to remain without eliminating the page information entry column 64, a range, in the image data, in which the extracted elimination pixels are to be eliminated may be specified, and the control portion 5 may eliminate the elimination pixels in the specified range. For example, elimination of an upper fifteenth part (about 410 pixels) of an A4 size paper sheet is prohibited, whereby the control portion 5 is allowed to leave necessary print information as it is while eliminating other print information in the print information elimination. In this case, in the image data having been subjected to the print information elimination, only the handwritten characters 71, the handwritten characters 72, the page information entry column 64, and the logo mark 67 on the upper part of the paper sheet are included.

Thus, in the multifunction peripheral 100 according to the first modification, not only the ruled lines but also pixels having the same density and color as the ruled lines can be extracted and eliminated from the image data of the paper sheet P. Namely, in the multifunction peripheral 100, a process of extracting, from the image data of the paper sheet P, lines extending in the length direction, diagonal lines, dotted lines, and the like, which have the same density and color as the ruled lines, and a process of determining the above lines and the like, can be performed, without executing a complicated calculation, with ease.

(Second Modification)

In the above embodiment, an exemplary case is described in which the multifunction peripheral 100 extracts, from the paper sheet P, only the ruled lines that are spaced by the ruled line distance. However, the present disclosure is not limited thereto. Hereinafter, as a second modification of the embodiment, the multifunction peripheral 100 that extracts the ruled lines, and thereafter rotates an image of the image data based on the ruled lines, so as to facilitate the viewing, will be described.

The second modification is different from the above embodiment in process steps of step S8 and the following steps of the ruled line elimination process shown in FIG. 3. The other structure and process steps are the same between the second modification and the above embodiment. Therefore, the different contents will be described and the description of the common contents is not given.

Figure 8:
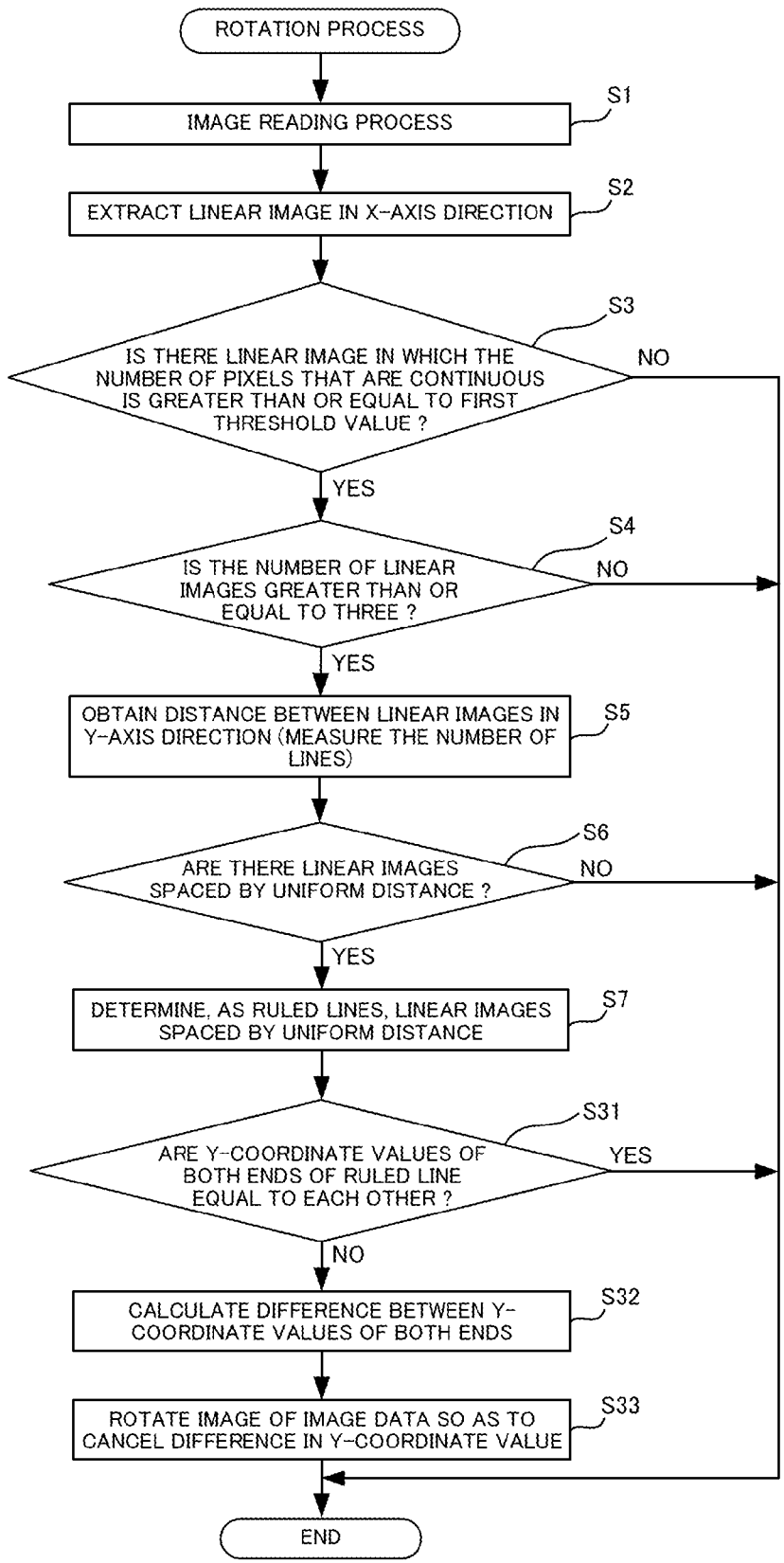
FIG. 8 is a flow chart illustrating an exemplary procedure of a print information elimination process according to a second modification.

Hereinafter, a procedure of a rotation process executed by the control portion will be described with reference to a flow chart of FIG. 8.

(Step S31)

When the ruled line is obtained by determination of step S7, the control portion 5 extracts coordinate information of both ends of the ruled line and determines whether or not Y-coordinate values of both the ends are equal to each other in step S31.

When the control portion 5 determines that the Y-coordinate values of both the ends is equal to each other, the control portion 5 ends the process (YES in S31). Namely, the control portion 5 determines that the paper sheet P is not inclined and therefore the image of the image data need not be rotated.

On the other hand, when the control portion 5 determines that the Y-coordinate values of both the ends are not equal to each other, the control portion 5 advances the process to step S32 (NO in S31).

When the control portion 5 thus determines, in step S31, whether or not the ruled line is inclined, based on positional information, in the image data, of both ends of the linear image having been determined as the ruled line in step S4 through step S7, the control portion 5 is an example of an inclination determination portion of the present disclosure.

(Step S32, Step S33)

Next, in step S32, the control portion 5 calculates a difference in the Y-coordinate value. Specifically, the control portion 5 subtracts a Y-coordinate value of a left end of the ruled line, from a Y-coordinate value of a right end of the ruled line, to calculate a difference in the Y-coordinate value.

In step S33, the control portion 5 rotates the image of the image data so as to cancel the difference in the Y-coordinate value. Specifically, when the difference represents a plus value, the control portion 5 determines that the ruled line is inclined in the right-upward direction, and rotates the image of the image data clockwise by a rotation amount corresponding to the difference in step S33. On the other hand, when the difference represents a minus value, the control portion 5 determines that the ruled line is inclined in the right-downward direction, and rotates the image of the image data counterclockwise by a rotation amount corresponding to the difference in step S33.

When the control portion 5 thus rotates, in a case where the ruled line is determined as being inclined in step S31, the image of the image data in a direction opposite to the inclination direction according to the degree of the inclination, and corrects the image data in step S32 and step S33, the control portion 5 is an example of a correction portion of the present disclosure.

The multifunction peripheral 100 according to the second modification can rotate an image of the image data of the paper sheet P such that a direction of the ruled line is made the same as a direction of a bottom side line of an outer frame of the image of the image data. Thus, the handwritten characters 71 and the handwritten characters 72 in the image data can be easy to read. Needless to say, the second modification may be implemented in combination with the above embodiment and the first modification of the present disclosure. Thus, while the ruled lines are eliminated, the orientations of the handwritten characters 71 and the handwritten characters 72 are changed by rotation, whereby the viewing can be facilitated.

<Another Application of Embodiment>

In the above embodiment, the multifunction peripheral 100 is described as an example of the image processing apparatus of the present disclosure. However, the present disclosure is not limited thereto.

The present disclosure may be implemented as a ruled line determination method in which the ruled lines are extracted and determined from the image data by execution of the process according to the above process steps. Further, the present disclosure may be implemented as a ruled line determination program and a storage medium having the ruled line determination program stored therein, by which the ruled lines are extracted and determined from the image data by causing a computer to execute the above process steps.

In the description of the present disclosure, the image reading portion 1 reads color image data of the paper sheet P, and performs processing based on the color hue. However, the present disclosure is not limited thereto. Gray scale image data representing density information alone, instead of the color image data, may be processed.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising a processor configured to function as:
   a first image extraction portion configured to extract, from image data, a plurality of linear images in each of which reference pixels each having a tone in a predetermined range are continuous so as to form a straight line;
   a first determination portion configured to determine, when the plurality of linear images extracted by the first image extraction portion include linear images that are spaced by a uniform distance, the linear images that are spaced by the uniform distance, as ruled lines;
   a second image extraction portion; and
   a second determination portion, wherein
   when, in the linear images extracted by the first image extraction portion, the number of the reference pixels that are continuous so as to form the straight line is greater than or equal to a first threshold value,
   the second image extraction portion is configured to extract, from the image data, a sub-linear image in which the number of the reference pixels that are continuous is less than the first threshold value and greater than or equal to a second threshold value; and
   the second determination portion is configured to determine the sub-linear image as the ruled line, when the sub-linear image is at a position spaced, by the uniform distance, from the ruled line determined by the first determination portion.

2. The image processing apparatus according to claim 1, wherein the tone represents one or both of a density and a hue.

3. The image processing apparatus according to claim 1, wherein the first determination portion determines, as the ruled lines, the linear images that are spaced, by the uniform distance, from the sub-linear image having been determined as the ruled line by the second determination portion.

4. The image processing apparatus according to claim 1, wherein the processor is further configured to function as:
   a third image extraction portion configured to extract, as dot-forming pixels, the reference pixels on straight lines which are represented by the linear images or the sub-linear image determined as the ruled lines, or extract, as dot-forming pixels, pixels that are within the predetermined range and located at positions spaced, by the uniform distance, from the linear images or the sub-linear image determined as the ruled lines, so as to extract the dot-forming pixels from the image data; and
   a third determination portion configured to determine, as the ruled lines, the dot-forming pixels extracted by the third image extraction portion.

5. The image processing apparatus according to claim 1, wherein the processor is further configured to function as an elimination portion configured to eliminate, from the image data, pixels having been determined as the ruled lines.

6. The image processing apparatus according to claim 5, wherein the elimination portion changes a pixel tone of a pixel to be eliminated, to a tone of a background color image of the image data.

7. The image processing apparatus according to claim 5, wherein
   the processor is further configured to function as a third image extraction portion configured to extract, from the image data, a pixel having the same tone as the linear images determined as the ruled lines by the first determination portion, as a pixel to be eliminated, and
   the elimination portion eliminates the pixel, to be eliminated, which is extracted by the third image extraction portion.

8. The image processing apparatus according to claim 1, wherein the processor is further configured to function as:
   an inclination determination portion configured to determine whether or not the ruled lines are inclined in the image data, based on positional information of both ends of each linear image determined as the ruled lines by the first determination portion; and
   a correction portion configured to rotate, when the inclination determination portion determines that the ruled lines are inclined, an image of the image data in a direction opposite to an inclination direction of the image, according to an inclination degree, to correct the image data.

9. A ruled line determination method comprising:
   a first image extraction step of extracting, from image data, a plurality of linear images in each of which reference pixels each having a tone in a predetermined range are continuous so as to form a straight line;
   a first determination step of determining, when the plurality of linear images extracted by the first image extraction step include linear images that are spaced by a uniform distance, the linear images that are spaced by the uniform distance, as ruled lines;
   a second image extraction step; and
   a second determination step, wherein
   when, in the linear images extracted in the first image extraction step, the number of the reference pixels that are continuous so as to form the straight line is greater than or equal to a first threshold value,
   the second image extraction step comprises extracting, from the image data, a sub-linear image in which the number of the reference pixels that are continuous is less than the first threshold value and greater than or equal to a second threshold value; and
   the second determination step comprises determining the sub-linear image as the ruled line, when the sub-linear image is at a position spaced, by the uniform distance, from the ruled line determined in the first determination step.

10. A non-transitory storage medium having stored therein a ruled line determination program that causes a computer to execute:
- a first image extraction step of extracting, from image data, a plurality of linear images in each of which reference pixels each having a tone in a predetermined range are continuous so as to form a straight line;
- a first determination step of determining, when the plurality of linear images extracted by the first image extraction step include linear images that are spaced by a uniform distance, the linear images that are spaced by the uniform distance, as ruled lines;
- a second image extraction step; and
- a second determination step, wherein
- when, in the linear images extracted in the first image extraction step, the number of the reference pixels that are continuous so as to form the straight line is greater than or equal to a first threshold value,
- the second image extraction step comprises extracting, from the image data, a sub-linear image in which the number of the reference pixels that are continuous is less than the first threshold value and greater than or equal to a second threshold value; and
- the second determination step comprises determining the sub-linear image as the ruled line, when the sub-linear image is at a position spaced, by the uniform distance, from the ruled line determined in the first determination step.

* * * * *